Aug. 30, 1949.   N. E. WAAG   2,480,529
SEAL ASSEMBLY
Filed May 3, 1944
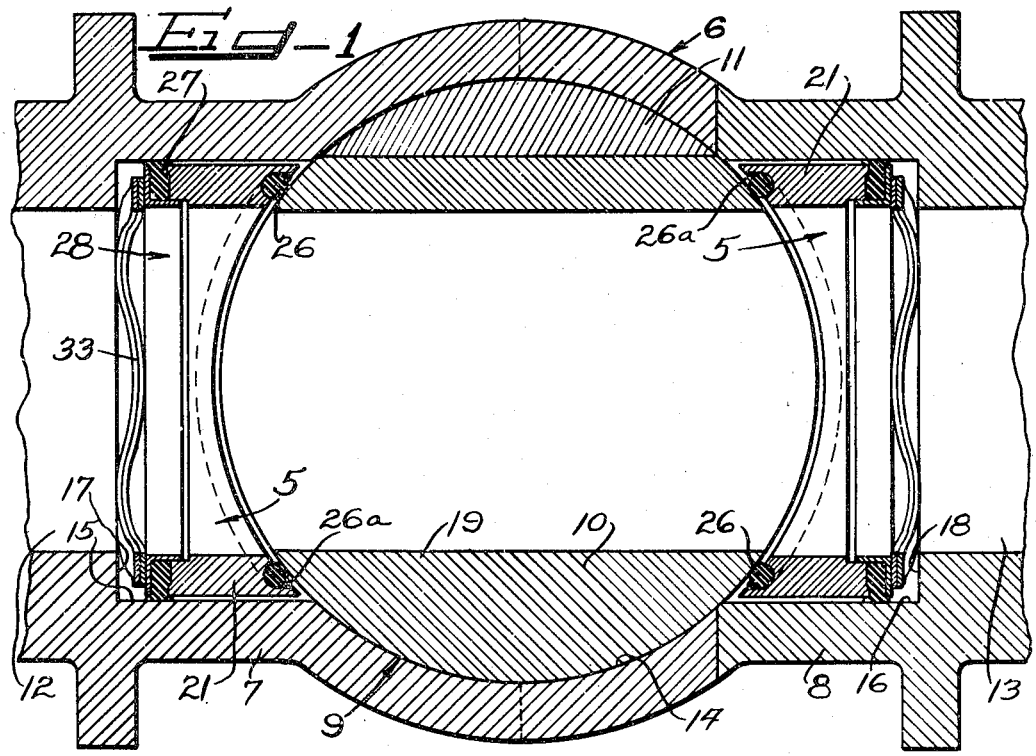
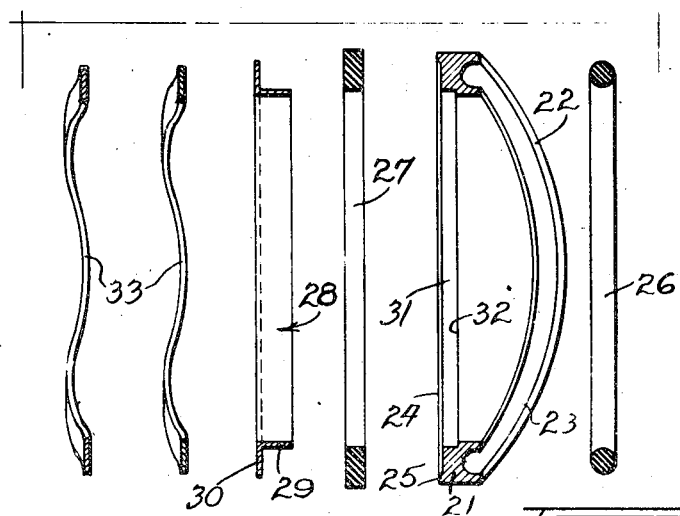
Inventor
Norman E. Waag Patented Aug. 30, 1949

2,480,529

UNITED STATES PATENT OFFICE 2,480,529

SEAL ASSEMBLY

Norman E. Waag, Cleveland, Ohio, assignor to Thompson Products, Inc., Cleveland, Ohio, a corporation of Ohio Application May 3, 1944, Serial No. 533,864

1 Claim. (Cl. 251—113)

The present invention relates to improved sealing means for use in fluid flow control devices and the like. The invention, more particularly, relates to a form of seal assembly advantageously adapted to be employed in selector cocks, shut-off valves, quick disconnect couplings and the like which embody a shiftable member for controlling the flow of fluid through a ported casing.

It is an object of the present invention to provide a form of seal assembly embodying a rigid seal retainer mounted in freely slidable relation in the port of the casing of the flow control device with which it is associated so as to prevent sticking of the assembly in the port opening.

It is another object of the present invention to provide an additional factor of safety in the operation of seal assemblies and the devices with which they are used by employing means retaining the resilient sealing means and having the same bonded or otherwise suitably secured thereto.

A further object of the invention is to provide a seal assembly which has a resilient sealing means for sealingly engaging the shiftable member of the device with which it is used and an auxiliary sealing means for sealing the wall of the port.

Another object of the present invention is to provide a retainer element in the seal assembly which cooperates with a guide means to insure uniform pressure on the auxiliary resilient seal disposed therebetween to effectively seal the port wall.

Another and further object of the present invention is to provide a form of seal assembly in which the elements or parts are easily and readily replaceable in the event that any one or more of said parts becomes worn and broken or for any reasons fails to effectively seal the fluid flow control device.

It is a further object of the present invention to provide a form of seal assembly embodying a form of resilient sealing means which will be free from shearing or gouging upon relative movement of the shiftable member and the ported casing of the flow control device in which it is disposed.

Another and still further object of the present invention is to provide a form of seal assembly having a rugged construction and capable of withstanding relatively high pressures without materially increasing the torque required to adjust the shiftable member with respect to the ported casing.

A further object of the present invention is to provide a form of sealing unit in which the resilient seals are of relatively thin cross-section and, therefore, not subject to excessive swelling or shrinkage due to varying conditions of temperature and pressure or the nature of the fluid being handled by the flow control device with which it is associated.

Another object is to provide a combined end seal and radial seal embodying a slidably mounted end seal and a rigidly backed radial seal cooperating with the slidable end seal to be pinched in an axial direction for radial expansion.

A still further object of the present invention is to provide a form of seal assembly which performs a positive sealing engagement between the shiftable member and the ported casing of a fluid flow control device and is, in addition, economically and easily manufactured.

Other and further objects of the invention will be apparent to those skilled in the art from the following detail description of the annexed sheet of drawings which, by way of preferred example only, illustrates one embodiment of the invention.

On the drawings:

Figure 1 represents a cross-section through a typical form of fluid flow control device embodying seal assemblies of the type to which the present invention relates and showing the parts in assembled and operating relationship; and Figure 2 is a vertical cross-sectional view illustrating the several parts or elements of the seal assembly of the present invention in disassembled relation.

As shown on the drawings:

A pair of seal assemblies, designated generally by the reference character 5, are employed in a quick-disconnect coupling unit 6. The coupling 6 comprises a pair of ported coupling boxes 7 and 8 provided with ports 12 and 13, respectively. The ports 12 and 13 communicate with a chamber 14 formed by the interfitted coupling boxes 7 and 8. The ports 12 and 13 have counterbores 15 and 16, respectively, formed adjacent the ends thereof which open into the chamber 14. The annular shoulders 17 and 18, respectively, are formed by the counterbores 15 and 16 internally of said ports 12 and 13.

The coupling boxes 7 and 8 are locked together in operative relation by means of a valve member or plug 9 made up of the parts 10 and 11. The plug 9 is rotatably mounted in the chamber 14 formed by the cooperative relationship of the boxes 7 and 8. When the plug 9 is disposed in the position illustrated in Figure 1 of the drawings, the coupling boxes 7 and 8 are locked together and the passage 19 formed wholly within the plug part 10 interconnects the respective ports 12 and 13 of the coupling boxes in unrestricted fluid flow communication.

When the valve member 9 is shifted so that the axis of the passage 19 is disposed in generally perpendicular relation to the illustrated position in Figure 1 of the drawings, the flow of fluid between the ports 12 and 13 will be cut off. By virtue of the separable construction of the parts 10 and 11 of the plug 9, the boxes 7 and 8 may be disconnected when the plug is rotated to its off position. It will thus be understood that in such constructions it is essential to provide a form of seal assembly which will positively and effectively seal the plug 9 and the respective ports 12 and 13 of the coupling boxes 7 and 8 both when the coupling unit 6 is assembled and disassembled so as to prevent leakage of fluid therefrom.

The sealing assemblies 5 of the present invention provide a very efficient form of sealing means for such units. In the illustrated embodiment of the invention, the seal assemblies 5 are adapted to be adjustably disposed in the respective counterbores 15 and 16 formed adjacent the chamber 14 in the ports 12 and 13 of coupling boxes 7 and 8. By virtue of the construction of the seal assemblies 5 they are adapted to be adjustable axially of the counterbores 15 and 16 so as to insure sealing engagement both with respect to the walls of said counterbores and to the outer periphery of the valve member or plug 9. Thus, the sealing assemblies 5 serve to form a fluid tight seal between the plug 9 and the ports 12 and 13 both when the coupling boxes 7 and 8 are connected and when they are disconnected.

Each seal assembly 5 embodies a rigid retainer 21 which, in this instance, is generally cylindrical in form although it may assume any suitable shape corresponding generally to that of the cross-sectional configuration of the port or counterbore thereof in which it is disposed. The retainer 21 has a concave or dished end face 22 which conforms generally to the periphery of the plug 9 of the coupling unit 6 and has an annular groove 23 of substantially semi-circular cross-section cut or formed therein. The other end face 24 of the retainer 21 is generally plane surfaced having a narrow rim portion 25 extending axially from said end face 24 and disposed adjacent the outer periphery of the retainer.

An O-ring 26 formed of suitable resilient sealing material is adapted to be positioned in the groove 23 of the retainer 21 and secured in place therein. The O-ring 26 may be formed of rubber, artificial rubber, Neoprene, or any other suitable flexible rubber-like plastic composition customarily employed in sealing valves and other similar units against leakage of fluid therefrom. The O-ring 26 is secured in the groove 23 of the retainer 21 as by means of rubber cement or any other suitable adhesive or bonding material 26a so as to be fixedly mounted in place therein and to resist relative movement with the walls of the groove.

When the several parts of the sealing assembly 5 are assembled together, a resilient washer 27 formed of a material similar to that employed in the fabrication of the O-ring seal 26 is adapted to be positioned against end face 24 of the retainer 21. The washer 27 is adapted to be held in place against the end face 24 and the rim portion 25 thereon as by means of a guide 28.

The guide 28 embodies a collar portion 29 which is adapted to extend through the inner diameter of the washer 27 and register with an annular cut 31 formed internally of the retainer 21. The annular cut 31 thus provides a limited relative telescopic movement of the guide 28 with respect to the retainer 21. A flanged portion 30 merges with the collar portion 29 of the guide 28 and forms a supporting surface for the face of the seal washer 27 opposite that in contact with the end face 24 of the retainer 21.

The outer peripheral dimension of the flanged portion 30 of the guide 28 is slightly less than the outer diameter of the seal washer 27. When the guide 28, the washer 27 and the retainer 21 are disposed in assembled relation, the axial or relative telescopic movement of the guide with respect to the retainer is limited by the shoulder 32 at one extremity of the annular cut 31 on the internal wall of the retainer 21. It will be understood that the extent of axial movement of the guide 28 with respect to the retainer 21 is also limited to a certain extent by the resiliency or flexibility of the seal washer 27 disposed between the flange 30 and the end face 24 on the guide 28 and the retainer 21, respectively.

In addition to the elements of the sealing assembly 5 previously described a suitable biasing means which may take the form of a pair of spring rings 33 is adapted to be inserted in the counterbores 15 or 16, as the case may be, against the respective shoulders 17 or 18. The springs 33 serve not only to maintain the several parts of the seal assembly in their proper assembled relation, but also urge the O-ring 26 into contact with the peripheral surface of the plug 9.

In addition, the springs 33 tend to bias the flanged portion 30 of the guide 28 against the washer 27 in contact with the end face 24 of the retainer 21. The biasing of the flanged portion 30 of the guide 28 against the washer 27 and the end face 24 of the retainer 21 causes the rim portion 25 to pinch or squeeze the washer 27 slightly. This squeezing of the washer 27 causes it to expand radially with respect to the collar portion 29 of the guide on which it is supported into sealing contact with the wall of the counterbore 15 thereby effecting a fluid tight seal therewith.

It will be readily understood that the seal assemblies 5 of the present invention are equally advantageously adapted to be employed in any one of several other suitable forms of fluid flow control devices which embodies a ported casing member having a shiftable valve member or the like for controlling the flow of fluid through the casing. The seal assemblies of the present invention are highly satisfactory in such flow control devices inasmuch as they are capable of withstanding relatively high pressure and wide variations in temperature of the fluid being handled by the flow control device with which they are associated.

The seal assemblies contemplated by the present invention employ comparatively small elements of sealing material which are affected by aromatic fluids generally causing swelling and shrinking of such plastics. Of course, if the sealing elements are made of Neoprene or similar material resistant to aromatic fluids, as indicated above, such effects will not occur at all. Moreover, any parts which become worn or broken or for any other reason cease to function properly may be readily replaced with substitute materials in an emergency and without in any way affecting the effectiveness of the operation of the seal assemblies.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A combined end seal and radial seal comprising a rigid retainer, a resilient member bonded to one end face of the retainer, a second resilient member thrusting against the other end face of the retainer, rigid means slidable relative to the retainer, and cooperating therewith to confine the second resilient member for radially outward movement only, localized rib means projecting axially into an end face of the second resilient member, and means urging the retainer and rigid means toward each other to cause the localized rib to pinch the second resilient member.

NORMAN E. WAAG.

REFERENCES CITED

The following references are of record in the file of this patent:

UNITED STATES PATENTS

| Number | Name | Date |
| --- | --- | --- |
| 783,953 | Henry | Feb. 28, 1905 |
| 1,062,064 | Ward | May 20, 1913 |
| 1,954,018 | Miller | Apr. 10, 1934 |
| 2,035,548 | Johnson | Mar. 31, 1936 |
| 2,203,989 | Hamer | June 11, 1940 |

FOREIGN PATENTS

| Number | Country | Date |
| --- | --- | --- |
| 805,137 | France | Aug. 17, 1936 |